United States Patent
Purpura

(10) Patent No.: US 7,154,859 B2
(45) Date of Patent: Dec. 26, 2006

(54) METHOD FOR IMPROVING BANDWIDTH PERFORMANCE OF A MOBILE COMPUTER NETWORK

(75) Inventor: William J. Purpura, Anaheim, CA (US)

(73) Assignee: The Boeing Company, Chicago, IL (US)

(*) Notice: Subject to any disclaimer, the term of this patent is extended or adjusted under 35 U.S.C. 154(b) by 828 days.

(21) Appl. No.: 10/000,563

(22) Filed: Oct. 24, 2001

(65) Prior Publication Data

US 2003/0076785 A1   Apr. 24, 2003

(51) Int. Cl.
*H04L 12/26* (2006.01)
*H04L 12/28* (2006.01)
*H07Q 7/24* (2006.01)

(52) U.S. Cl. ............... 370/252; 370/395.21; 370/338; 370/248

(58) Field of Classification Search ............... 370/252, 370/468, 338, 395.21, 235, 389, 248
See application file for complete search history.

(56) References Cited

U.S. PATENT DOCUMENTS

| | | | |
|---|---|---|---|
| 5,596,575 A | 1/1997 | Yang et al. | |
| 5,922,052 A | 7/1999 | Heaton | |
| 5,968,126 A * | 10/1999 | Ekstrom et al. ............ | 709/225 |
| 6,061,562 A | 5/2000 | Martin et al. | |
| 6,167,239 A | 12/2000 | Wright et al. | |
| 6,253,067 B1 | 6/2001 | Tsuji | |
| 6,477,152 B1 * | 11/2002 | Hiett .......................... | 370/316 |
| 6,714,985 B1 * | 3/2004 | Malagrino et al. .......... | 709/236 |
| 6,859,463 B1 * | 2/2005 | Mayor et al. ................ | 370/445 |
| 2002/0077144 A1 * | 6/2002 | Keller et al. ................. | 455/550 |
| 2002/0093982 A1 * | 7/2002 | Joy et al. ..................... | 370/468 |
| 2003/0016630 A1 * | 1/2003 | Vega-Garcia et al. ....... | 370/252 |
| 2003/0053433 A1 * | 3/2003 | Chun .......................... | 370/338 |
| 2003/0060210 A1 * | 3/2003 | Ravishankar et al. ....... | 455/452 |
| 2005/0174973 A1 * | 8/2005 | Kandala et al. ............. | 370/338 |

OTHER PUBLICATIONS

Crayford I: Fast Ethernet Gets Plug-and-Play, Weston Conference, IEEE Center, Hoes Lane, US, pp. 354-359; XP000586593.
WO 00 14987 A (Gresham Simon Isaac; Bastian Fabio (AU); Tenzing Inc (US); Lemme P; Mar. 16, 2000.
WO 00 56021 A (Vocaltec Communications Ltd; Caster Noam (IL); Pogrebinsky Vladimi; Sep. 21, 2000.

* cited by examiner

*Primary Examiner*—Ricky Q. Ngo
*Assistant Examiner*—Feben Micael Haile
(74) *Attorney, Agent, or Firm*—Harness Dickey & Pierce P.L.C.

(57) ABSTRACT

A method for improving data throughput across a local area network (LAN) that is adapted for use onboard an aircraft (mobile LAN) and that may also be connected to at least one wide area network (WAN). To improve data throughput across the computer network, the mobile LAN's system software automatically evaluates and modifies, if necessary, the operation parameter settings of a personal computer connected to the mobile LAN. The present invention also discloses a real-time throughput optimization procedure that is comprised of sending a series of sample file types to a predetermined recipient and setting the operational parameter settings on the user's PC and the data packet size to a set of values that produce the fastest throughput for the file type associated with the user's primary activity.

16 Claims, 6 Drawing Sheets

METHOD FOR IMPROVING BANDWIDTH PERFORMANCE OF A MOBILE COMPUTER NETWORK

FIELD OF THE INVENTION

The present invention relates in general to computer networks, and more particularly to a method for improving bandwidth performance of a mobile computer network.

BACKGROUND OF THE INVENTION

Computer networks provide a relatively convenient and reliable means for individuals to communicate with one another, as well as the ability to access and/or transfer large quantities of information to or from remote locations. Computer networks come in an infinite variety of sizes and configurations, ranging from local area networks (LANs) that span relatively small geographic areas and may consist of only a few computers to large wide-area networks (WANs) that span a large geographical area and may be comprised of millions of computers. A WAN typically consists of two or more LANs. The largest WAN in existence is the Internet.

Networked computers can be connected using various media, such as twisted-pair wire, coaxial cables, or fiber optic cables. Some networks, however, do not use any connecting media, but instead use radio waves as the communication medium. Computers attached to a WAN are often connected through public networks, such as the telephone system, or through leased lines (i.e., T-1 lines) or satellites. Indeed, the variety of available connection methods makes it possible to establish network connections under a variety of conditions, including for example, on board an airplane.

Referring to FIG. 1, there is shown a functional block diagram of a typical computer network 10. The network includes a LAN 14 (mobile LAN) that is located onboard an airplane (not shown). The mobile LAN 14 enables an individual onboard the airplane, using a personal computer (PC) 12, to send and receive information to and from remote locations. Connections between the mobile LAN 14 and terrestrial based networks, such as the Internet 16 and corporate intranets 18, can be accomplished using space based transponders 20 (i.e., satellites).

The overall performance (i.e., data throughput) of a given network may vary significantly depending on multiple factors. Such factors may include the transport media used to connect the data links, the type of data being sent, the hardware being used by the user, and the type of technology accessed along the network. The user typically has little or no control over many of these factors. However, it may be possible for a user to realize significant improvements in network throughput by adjusting one or more of the user controlled hardware and software parameter settings (operational parameters) on the user's PC. Depending on the type of data the user intends to send or receive and the configuration of the network, it is possible to adjust the size of the data packets and the system operational parameter settings on the user's PC in order to maximize data throughput. Preferably these adjustments would be performed automatically when the user's PC is connected to the mobile LAN, with little or no input from the user. Accordingly, it is desirable to develop a method for determining the hardware and software settings of a PC connected to the mobile LAN, and automatically adjust, if necessary, the packet size and certain operational parameter settings on the PC in order to achieve the maximum possible network data throughput.

SUMMARY OF THE INVENTION

In accordance with the present invention, a preferred method and system is disclosed for improving data throughput over a local area network (LAN) adapted for use onboard an aircraft (mobile LAN). The mobile LAN may be connected to a wide area network (WAN), such as the Internet, through the use of satellite transponders. When a user onboard the aircraft connects a PC to the mobile LAN, the mobile LAN's system software automatically determines which network connection types are present on the user's PC. If more than one connection type is available, the system software asks the user to select a primary connection type. The software then proceeds to evaluate and modify, if necessary, the operation parameters on the user's PC based on the primary connection type. The system software may make further adjustments to the hardware and software settings on the user's PC based on the type of activity the user will primarily be performing, such as accessing on-board services or sending and retrieving graphics files across the Internet. The operational parameters are set to predetermined values that will likely result in the maximum network data throughput for the type of activity the user will be performing. Once the necessary adjustments are completed the user is logged onto the mobile LAN.

While connected to the mobile LAN, the user has the option of having the software perform a real-time throughput optimization procedure. The procedure consists of sending a predetermined number of series of sample file types, for example, graphics, text, and data files, to a ground-based recipient. The system software varies the operational parameter settings on the user's PC for each series of files sent. The actual time it takes for each series of files to reach the recipient is measured and recorded. After all of the file series have been sent, the software will change the operational parameters on the users PC to coincide with the operational parameter settings that resulted in the fastest throughput for the file type associated with the user's primary activity. The user may run the real-time throughput optimization procedure as often as desired.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
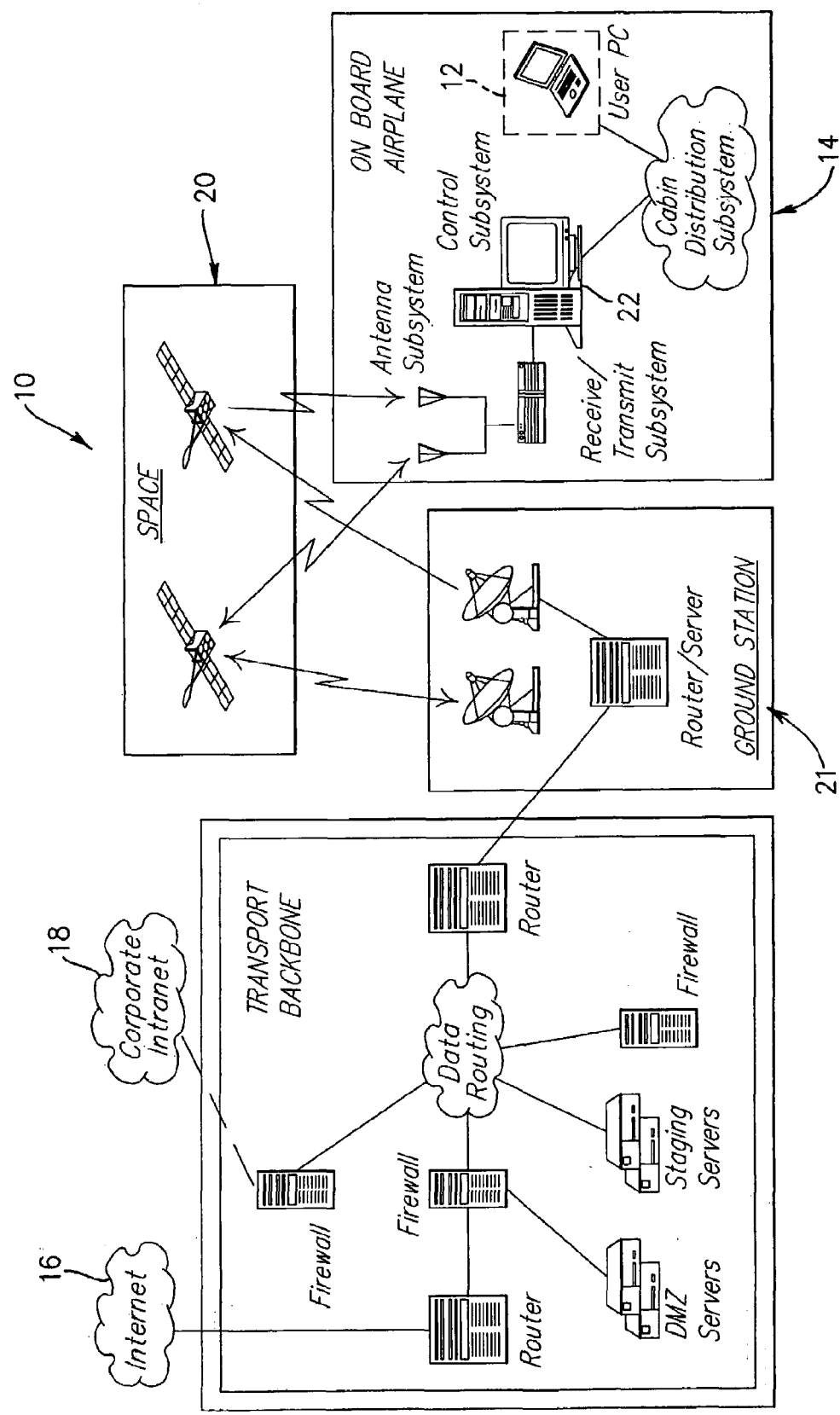
FIG. 1 is functional block diagram of a typical computer network that includes a local area network (LAN) adapted for use onboard an airplane.

Referring to FIG. 1, the present invention relates to a method for optimizing data throughput over a LAN 14 that is adapted for use onboard an aircraft (not shown). If desired, the mobile LAN 14 may be connected to one or more networks residing outside the aircraft, such as the Internet 16 or corporate intranet 18, by using extraterrestrial transponders, such as a satellite 20, to relay communication signals between the networks. A user onboard the aircraft has the option of connecting a personal computer 12 (PC) or other digital device to the mobile LAN 14 using various connection methods. For the purpose of the present invention, the available connection methods preferably comprise a conventional Ethernet (IEEE 802.3 10BaseT) connection using a RJ-45 connector, a conventional USB Version 1.0 Type-B Port, and a conventional Wireless LAN 802.11 B. It will be appreciated, however, that other connection methods may be used with equally satisfactory results and are considered to be within the scope of the present invention. A system suitable for implementing communications between the aircraft, ground station 21, and satellite 20 is disclosed in U.S. application Ser. No. 09/639,912, the disclosure of which is hereby incorporated by reference.

Continuing to refer to FIG. 1, a conventional network server 22 manages the network resources of the mobile LAN 14. When a user connects their PC 12 to the mobile LAN 14 using any of the three previously described connection methods, the network server 22 automatically detects the connection type and proceeds to make adjustments to certain predetermined software and hardware settings (operational parameters) on the user's PC 12 that will result in improved bandwidth performance of the network connection.

Figure 2:
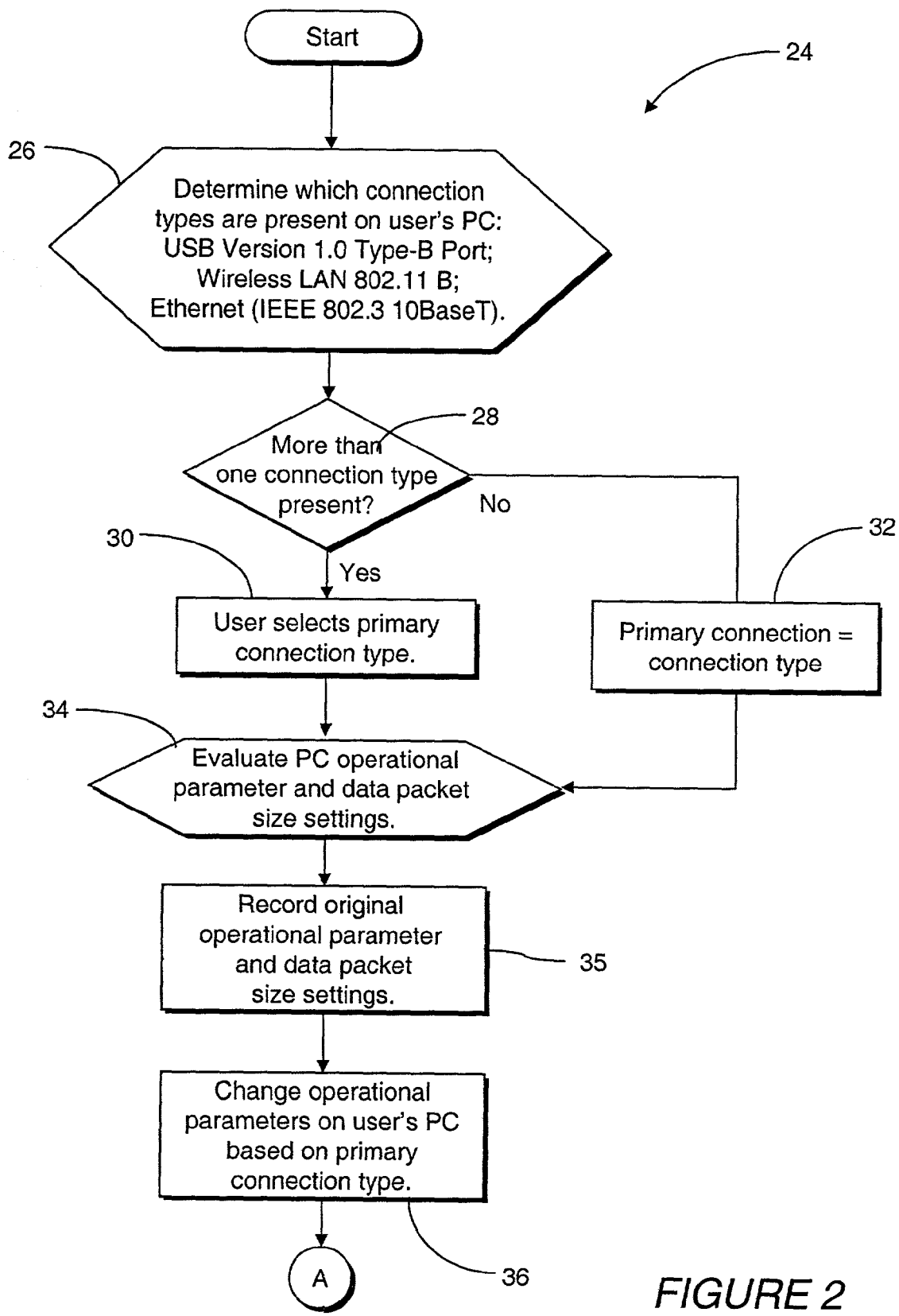
FIG. 2 is a flow chart depicting a preferred embodiment of a method for improving the throughput across the mobile LAN, which is performed before a user logs onto the mobile LAN.

Referring to FIG. 2, there is shown a flowchart depicting a preferred method of an initial optimization procedure 24 for improving data throughput over the mobile LAN 14. The initial optimization procedure 24 is performed before the user logs onto the mobile LAN 14. The initial optimization procedure 24 may be implemented through a variety of means, such as software, hardware, or some combination of thereof. For the purposes of this discussion, however, it will be assumed that the initial optimization procedure 24 is implemented through software that is executed from the network server 22.

The initial optimization procedure 24 commences when the network server 22 senses that a connection has been established between the user's PC 12 and the mobile LAN 14. The procedure 24 consists of first determining which connection types are present on the user's PC 12 (step 26). If more than one connection type is present (step 28), the procedure 24 proceeds to step 30, which requires the user to select a primary connection type from the available connection types (i.e., Ethernet, USB, Wireless LAN). However, if the user's PC 12 only has one connection type, step 30 is bypassed and the connection type is automatically set as the primary connection type without requiring any further input from the user (step 32).

Once the primary connection type has been established, the initial optimization procedure 24 proceeds to step 34 where the current operational parameter and data packet size settings on the user's PC 12 are evaluated. Using conventional means, the network server 22 records the current operational parameter and data packet settings so that they may be returned to their original settings when the user logs off the airborne LAN 14 (see method 70 shown in FIG. 6). In step 36, the procedure 24 determines the optimum operational parameter settings for the user's PC 12 based on the primary connection type. The procedure 24 then automatically sets, if necessary, the operational parameters on the user's PC 12 to their optimum settings.

Figure 3:
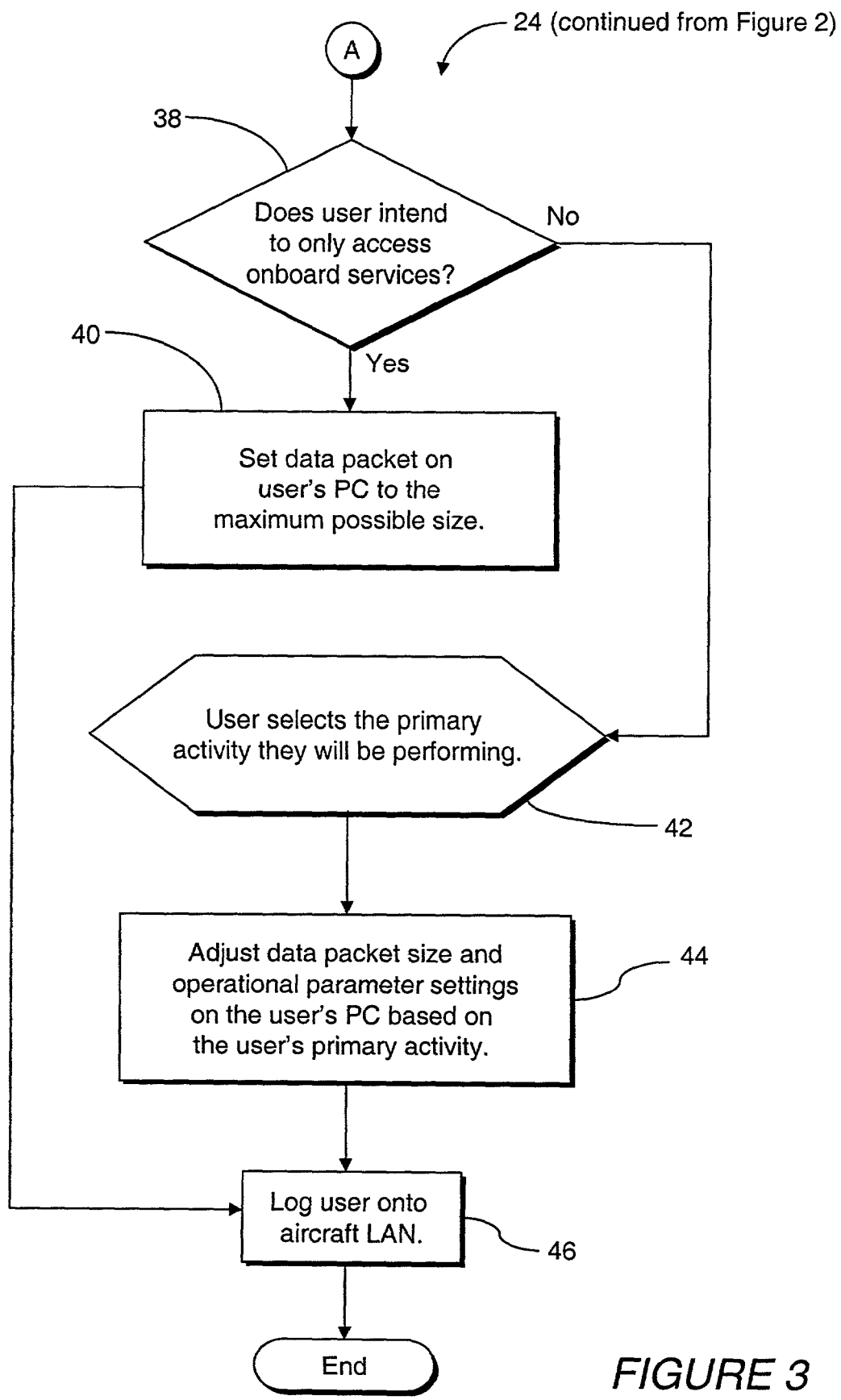
FIG. 3 is a continuation of the flow chart shown in FIG. 2.

Referring now to FIG. 3, the next step in the optimization process 24 involves determining the ideal hardware and software settings on the user's PC 12 and the appropriate data packet size base on the type of activity the user will primarily be performing. The actual settings will vary depending on whether the user only intends on accessing the onboard services, or whether they intend on accessing other services that require establishing communication links outside the aircraft. If the user only intends on accessing the onboard network server 22 (step 38), the procedure 24 sets the data packets to their maximum possible size (step 40). On the other hand, if the user plans on accessing services that require establishing a remote communication link, the user is requested to select the most probable type of activity they expect to be performing (step 42). The user is provided several choices from which to choose, such as sending and receiving E-mail, data files, graphics files, or Internet browsing. The procedure 24 then evaluates the relevant hardware and software setting on the user's PC 12 with regard to the type of data that will be transferred. From the resulting information the procedure 24 determines the optimum packet size and the appropriate hardware settings on the user's PC 12 that will likely provide the maximum network throughput. Once the hardware and interface settings are established, the procedure 24 automatically makes the necessary hardware and software adjustments on the user's PC 12 (step 44), which enables the user to logon to the mobile LAN 14 (step 46).

Figure 4:
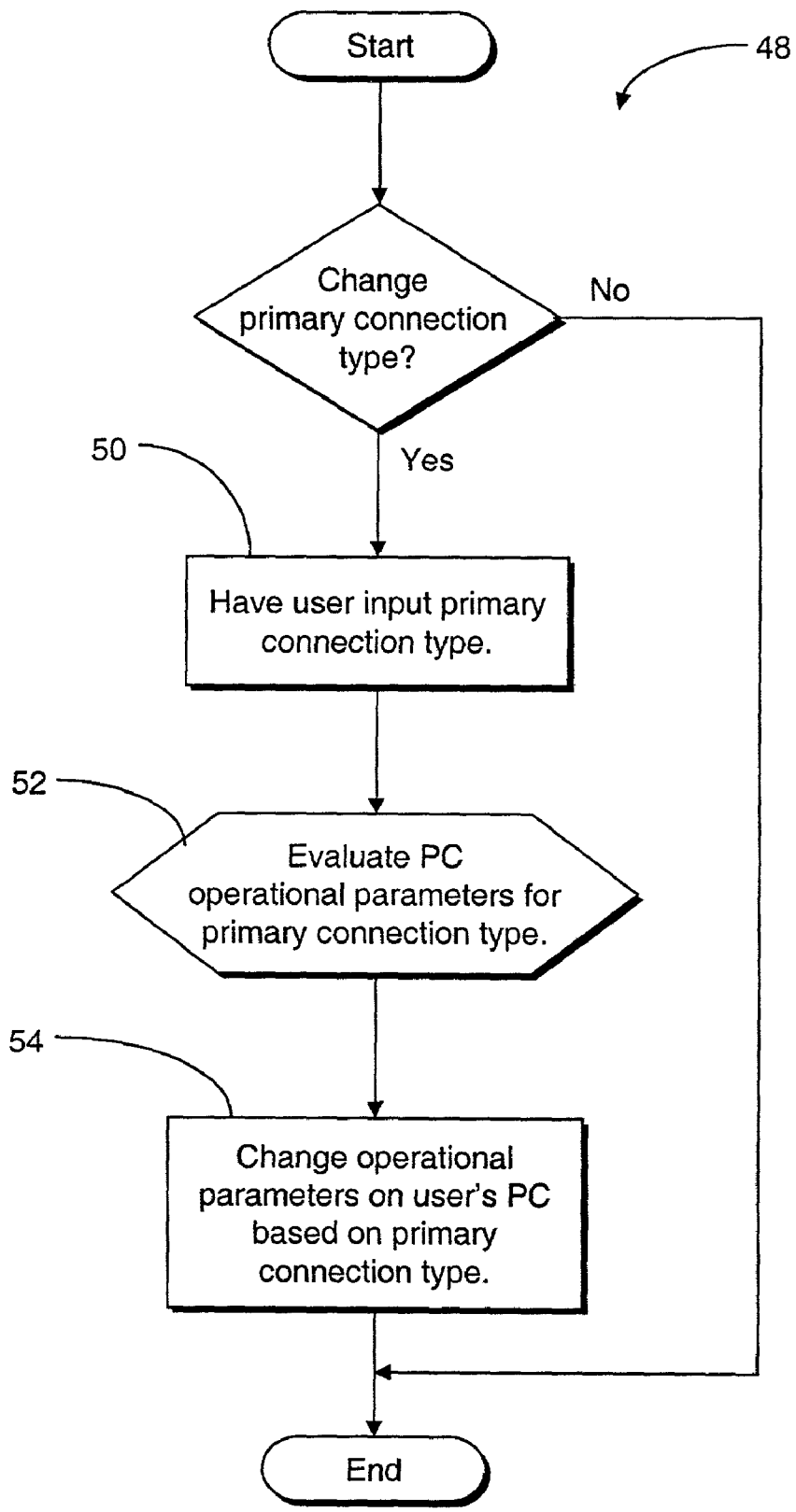
FIG. 4 is a flow chart depicting a preferred embodiment of a method for changing the primary connection type after a user has logged onto the mobile LAN.

The user has the option of changing the primary connection type at any time while connected to the mobile LAN 14. This can be accomplished without having to have the user logoff the mobile LAN 14. Referring to FIG. 4, there is shown a method 48 for changing the primary connection type after the user has logged onto the mobile LAN 14. If the user desires to change the primary connection type, the user must first select a primary connection type from the available connection methods (i.e., Ethernet, USB, or wireless LAN) (step 50). Since the current operational parameter settings on the user's PC 12 were established based on the previously selected primary connection type, the settings must be reevaluated based on the newly selected primary connection type (step 52). Upon establishing a new set of operational parameters, the procedure 24 automatically changes, if necessary, the operational parameters on the user's PC 12 to the appropriate settings (step 54).

When the user first connects their PC 12 to the mobile LAN 14, the network system performs the previously described initial optimization procedure 24 (see FIGS. 2 and 3). The initial optimization procedure 24 involves adjusting the operational parameter settings on the user's PC 12 based on the connection type selected and the primary activity that the user will be performing. Although the procedure will likely improve the overall performance of the mobile LAN 14, it may not result in the best possible performance. As mentioned previously, there are many factors that may effect the performance of a computer network, such as the type of data being sent, the hardware being used by the user to connect to the network, and the configuration of the various networks through which data will pass. Since the initial optimization procedure 24 is performed before the user logs onto the mobile LAN 14, the procedure does not yet know anything about other networks to which the user may wish to connect. Consequently, the initial optimization procedure 24 cannot directly compensate for network performance degradation caused by networks other than the mobile LAN 14. However, once the user is logged onto the mobile LAN 14 and a communication link is established between the mobile LAN 14 and another network, it is then possible to further adjust the operational parameter settings on the user's PC 12 to compensate for performance degradation caused by the other networks.

Figure 5:
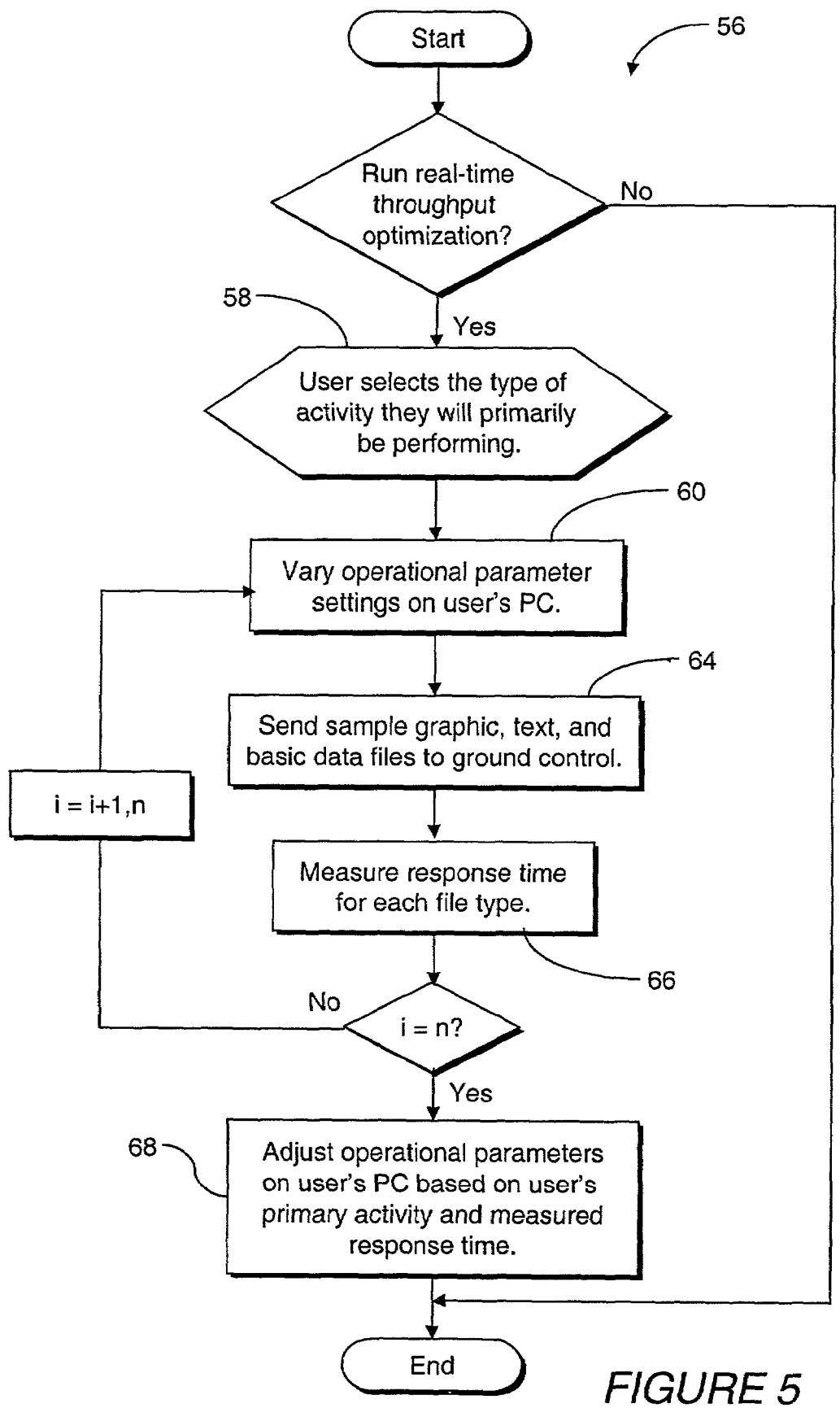
FIG. 5 is a flow chart depicting a preferred embodiment of a method for improving the data throughput over a network that is comprised of a mobile LAN, which is performed after the user logs onto the mobile LAN.

Referring to FIG. 5, there is shown a real-time throughput optimization method 56 for determining the operational parameter settings on the user's PC 12 that will improve data throughput across an entire network, not just the mobile LAN 14. If the user elects to run the real-time optimization procedure 56, the procedure first requests that the user input the type of activity they will primarily be performing (step 58).

After the user selects a primary activity, the procedure 56 proceeds to step 60, which is the starting point for an iterative process that the real-time optimization procedure 56 uses to determine the proper operational parameter settings for the user's PC 12. In step 60, the procedure 56 sets the operational parameters on the user's PC 12 to some predetermined values. Samples of various file types, such as a graphics file, text file and a basic data file, are then transmitted to a ground control station 21 (see FIG. 1) and the time it takes for each file type to be delivered in its entirety is measured and recorded (steps 64 and 66). This process is repeated a predetermined number of times, with the procedure 56 varying the operational parameter settings on the user's PC 12 for each iteration. The resulting data shows the affect that changing certain operational parameters will have on the actual time it takes to transfer a given file type. From the resulting information the program can determine which operational parameter settings will provide the fastest throughput for a given file type. In step 68, the procedure 56 adjusts, if necessary, the operational parameter settings on the user's PC 12 to correspond with the values that produce the fastest throughput for the file type associated with the user's primary activity. The user may run the real-time throughput optimization procedure 56 as often as desired while logged onto the mobile LAN.

Figure 6:
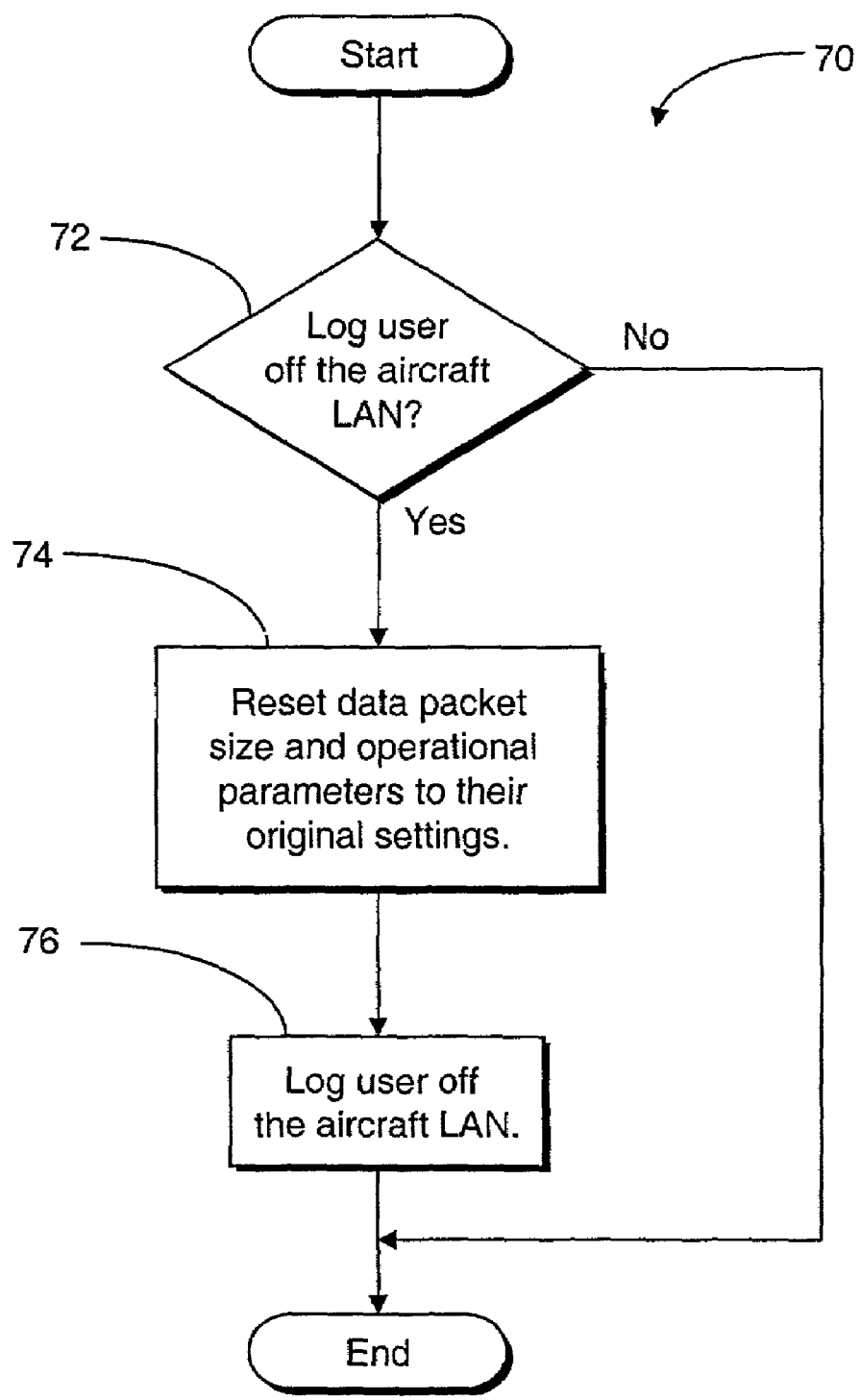
FIG. 6 is a flow chart depicting a preferred embodiment of a method for returning the data packet size and operational parameter settings on the user's PC to their original values when the user logs off from the mobile LAN.

Referring to FIG. 6, there is shown a method 70 for returning the data packet size and operational parameter settings on the user's PC 12 to their original values when the user logs off from the airborne LAN. The original settings are evaluated (step 34) and recorded (step 35) when the user's PC 12 is first connected to the airborne LAN 14. Choosing to log off from the airborne LAN 14 (step 72) causes the network server 22 to reset the data packet size and operational parameter settings on the user's PC 12 to their original values (step 74). After the settings are returned to their original values the user is logged off from the airborne LAN 14 (step 76).

The present invention provides an effective means for improving the bandwidth performance a mobile computer network. The method requires very little input from the user and is capable of achieving improvements in bandwidth performance across multiple interconnected networks that may be utilizing vastly differing technologies.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for improving the data throughput across a computer network, which is comprised of a local area network adapted for use onboard a platform and a computing device connected to the local area network, comprising:
   determining the operational parameter settings on the computing device by:
   (a) sending a series of sample file types from the computing device to a predetermined recipient;
   (b) measuring and recording the time it takes for each sample file type to travel from the computing device to the predetermined recipient;
   (c) changing the operational parameter settings on the computing device to a new value;
   (d) repeating operations (a) through (c) for a predetermined number of times; and
   (e) determining, based on operation (d), which operational parameter settings for the computing device provide the fastest throughput for a particular sample file type, with the particular sample file type corresponding to a particular type of activity selected by a user.

2. The method of claim 1, further comprising:
   bypassing the step of changing the operational parameter settings for a given operational parameter when the operational parameter is already set to the value that will result in improved data throughput across the computer network.

3. The method of claim 1, wherein changing the operational parameter settings on the computing device to values that will result in improved data throughput across the computer network further comprises:
   determining a connection type used to connect the computing device to the local area network onboard the platform; and
   using the connection type to determine the operational parameter settings that will result in improved data throughput across the computer network.

4. The method of claim 3, wherein determining the connection type used to connect the computing device to the local area network onboard the platform further comprises:
   having a user of the computing device select the connection type when the computing device has more than one connection type available for use.

5. The method of claim 1, further comprising:
   changing a data packet size setting on the computing device to a value that will result in improved data throughput across the computer network.

6. The method of claim 5, wherein changing the data packet size setting on the computing device to a value that will result in improved data throughput across the computer network further comprises:
   determining a primary type of activity that a user of the computing will be performing; and
   using the primary type of activity to determine the data packet size that will result in improved data throughput across the computer network.

7. The method of claim 6, wherein using the primary type of activity to determine the data packet size that will result in improved data throughput across the computer network further comprises:

setting the data packet size to its maximum value when the user's primary type of activity does not require accessing a computer network other than the local area network onboard the platform.

8. The method of claim 1, further comprising:

determining a primary type of activity that a user of the computing device will be performing; and using the primary type of activity to determine the operational parameter settings that will result in improved data throughput across the computer network.

9. A method for improving the data throughput across a computer network, which is comprised of a local area network adapted for use onboard a mobile platform and a computing device connected to the local area network, comprising:

sending a series of sample file types from the computing device to a predetermined recipient a predetermined number of times, the series of sample types including least one file type selected from a group comprising: a sample graphics file, a sample text file, and a sample basic data file;

changing the operational parameter settings on the computing device to a predetermined set of values each time the series of sample files is sent to the predetermined recipient;

measuring and recording the time it takes for each sample file type to travel from the personal computer to the predetermined recipient; and changing the operational parameter settings on the computing device to a set of values that produce the shortest recorded transfer time for a particular sample file type.

10. The method of claim 9, wherein the predetermined recipient is not located onboard the mobile platform.

11. The method of claim 9, further comprising:

providing a user of the computing device with the capability to select a primary type of activity they will be performing; and enabling use of the primary type of activity selected to determine which set of operational parameters produces the shortest recorded transfer time, the primary type of activity corresponding to the particular sample file type.

12. A method for improving the data throughput across a computer network, which is comprised of a local area network adapted for use onboard a mobile platform and a computing device connected to the local area network, comprising:

determining which connection types are present on the computing device;

allowing a user of the computing device the capability to select a primary connection type when more than one connection type is available;

determining the operational parameter settings on the computing device;

using the primary connection type to establish the operational parameter settings that will result in improved data throughput across the computer network and determining the operational parameter settings by:

(a) sending a series of sample file types from the computing device to a predetermined recipient, the sample file types including at least a sample text file, a sample graphics file and a sample basic data file;

(b) measuring and recording the time it takes for each of the sample file types to travel from the computing device to the predetermined recipient;

(c) changing the operational parameter settings on the computing device to a new value;

(d) repeating operations (a) through (c) for a predetermined number of times; and (e) determining, based on operation (d), which operational parameter settings for the computing device provides the fastest throughput for a particular sample file type.

13. The method of claim 12, further comprising:

providing the user of the computing device with the capability to select a primary type of activity they will be performing;

enabling use of the primary type of activity selected to determine the data packet size that will result in improved data throughput across the computer network; and setting the data packet size on the computing device to the size that will result in improved data throughput across the computer network for the primary type of activity being performed.

14. The method of claim 13, further comprising returning the data packet size and operational parameters to their original settings when the user logs off from the computer network.

15. The method of claim 12, further comprising:

providing the user of the computing device with the capability to select a primary type of activity they will be performing;

using the selected primary type of activity to determine the operational parameter settings that will result in improved data throughput across the computer network; and setting the operational parameters on the computing device to the values that will result in improved data throughput across the computer network for the primary type of activity being performed, the primary type of activity corresponding to the particular sample file type.

16. A method for improving the data throughput across a computer network, which is comprised of a local area network adapted for use onboard a platform and a computing device connected to the local area network, comprising:

(a) sending a series of sample files types of from the computing device to a predetermined recipient;

(b) measuring and recording the time it takes for each of the sample file types to travel from the computing device to the predetermined recipient;

(c) changing the operational parameter settings on the computing device to a new value;

(d) repeating operations (a) through (c) a predetermined number of times; and (e) determining, based on operation (d), which operational parameter settings for the computing device provides the fastest throughput for a particular file type, with the particular file type associated with a primary type of activity selected by a user.

* * * * *